United States Patent
Claman et al.

(10) Patent No.: US 9,864,973 B2
(45) Date of Patent: Jan. 9, 2018

(54) METHODS AND SYSTEMS FOR COLLABORATIVE MEDIA CREATION

(71) Applicant: AVID TECHNOLOGY, INC., Burlington, MA (US)

(72) Inventors: Timothy H. Claman, Andover, MA (US); Straker J. Coniglio, Lexington, MA (US); Stephane Daigle, Montreal (CA); Robert A. Gonsalves, Wellesley, MA (US); Ronald C. Wallace, Lexington, MA (US)

(73) Assignee: Avid Technology, Inc., Burlington, MA (US)

( * ) Notice: Subject to any disclaimer, the term of this patent is extended or adjusted under 35 U.S.C. 154(b) by 1044 days.

(21) Appl. No.: 13/841,799

(22) Filed: Mar. 15, 2013

(65) Prior Publication Data

US 2013/0275312 A1 Oct. 17, 2013

Related U.S. Application Data

(60) Provisional application No. 61/623,156, filed on Apr. 12, 2012.

(51) Int. Cl.
*G06Q 10/00* (2012.01)
*G06Q 10/10* (2012.01)

(52) U.S. Cl.
CPC ................. *G06Q 10/103* (2013.01)

(58) Field of Classification Search
CPC ..... G06Q 10/101; G06Q 10/103; G06Q 10/06
See application file for complete search history.

(56) References Cited

U.S. PATENT DOCUMENTS

| | | | |
|---|---|---|---|
| 2007/0198584 A1* | 8/2007 | Vienneau | G06Q 10/10 |
| 2011/0026898 A1* | 2/2011 | Lussier | G11B 27/034 |
| | | | 386/280 |

OTHER PUBLICATIONS

Adobe Creative Cloud, Product Information, Adobe, Mar. 2012, http://web.archive.org/web/20120315062952/http://www.adobe.com/products/creativecloud.html.

(Continued)

*Primary Examiner* — Maria C Santos-Diaz
(74) *Attorney, Agent, or Firm* — Oliver Strimpel

(57) ABSTRACT

A collaboration server hosts software for collaborative composition and editing of a media project with project collaborators using different media editing applications each having their own native data format. Project collaborators, such as video editors, sound editors, effects and graphics artists, and producers access a shared project workspace which contains a snapshot of the current state of the media project in a canonical format, as well as source media files, native application metadata, and change notes. Each editing application includes a module enabling it to read the canonical snapshot representation, and also to flatten its native data model representation into the canonical representation for writing to the shared project workspace. A collaboration server hosts the shared project space, and includes a workflow manager for issuing change notifications and handling versions, and an application server for the shared project user interface. Change notes are generated manually and also expressed automatically in terms of machine-readable change primitives that serve to direct an editor's attention to portions of the media project needing attention.

15 Claims, 16 Drawing Sheets

(56) References Cited

OTHER PUBLICATIONS

Avid Interplay Central, Product Brochure, Avid, Mar. 2012, http://web.archive.org/web/20120319113421/http://www.avid.com/US/products/Avid-Interplay-Central.
Avid Interplay Central User's Guide, Avid, Sep. 20, 2011, Chapters 2, 5 & 6, pp. 1-8, 28-36, and 63-75.
Google Docs, Online documents with real-time collaboration, Google, Mar. 2012, http://web.archive.org/web/20120331023655/http://www.google.com/apps/intl/en/business/docs.html.

* cited by examiner

FIG. 16

Canvas — Pilot

Change History

| App | Date | User | Tracks |
|---|---|---|---|
| MC | 4/14/2013 6:14 AM | sconigli | V1,A1,A2 |
| AE | 4/14/2013 4:52 AM | sdaigle | V2 |
| PT | 4/14/2013 3:15 AM | rgonsalv | A3 |
| MC | 4/14/2013 11:05 AM | rwallace | V1,A1,A2 |
| MC | 4/14/2013 10:22 AM | rgonsalv | V1,V2,A1,A2 |
| MC | 4/13/2013 5:01 PM | rgonsalv | V1,A1,A2 |
| PS | 4/13/2013 3:44 PM | sconigli | V2 |
| MC | 4/13/2013 2:89 PM | tclaman | V1,A1,A2 |
| MC | 4/12/2013 1:12 PM | sconigli | V1,A1,A2 |
| PT | 4/12/2013 10:40 AM | sdaigle | A3 |
| AE | 4/11/2013 9:51 AM | rwallace | V3 |
| MC | 4/11/2013 8:20 AM | rgonsalv | V1,A1,A2 |

Review Comments

| Comment | User | Position |
|---|---|---|
| Looks good! | tclaman | 01:05:22:14 |
| OK out the opening shot down a bit | sconigli | 01:05:22:14 |
| Needs faster pace to the dialog | tclaman | 01:05:22:14 |

Media Player 01:05:22:14

Composition Versions

| | Name | User | Tracks |
|---|---|---|---|
| | Pilot Director's Cut | tclaman | V1,V2,A1,A2,A3 |
| | Pilot Editor's Cut ver2 | rwallace | V1,A1,A2 |
| | Pilot Editor's Cut ver1 | rgonsalv | V1,A1,A2 |

Timeline — Pilot Director's Cut 01:05:22:14

V2
V1
A1
A2
A3

METHODS AND SYSTEMS FOR COLLABORATIVE MEDIA CREATION

CROSS REFERENCE TO RELATED APPLICATION

This application claims right of priority to and the benefit under 35 U.S.C. §119(e) of U.S. provisional patent application Ser. No. 61/623,156, filed Apr. 12, 2012, which is incorporated herein by reference.

BACKGROUND

The production of a film or video composition generally involves a number of different participants, such as video editors, composers, audio editors, special effects and graphics artists, and producers. In order for a project to be completed in a time and cost efficient manner, the participants must be able to work together effectively. Yet collaboration among production team members is often complex, not secure, and cumbersome. For example, in order to share a bin or project with a collaborator, an editor must export media and sequences using a process that involves wrapping them up in a suitable container and transferring them to another team member. This process can involve conversion of media from one format to another, a computationally expensive process that can cause loss of quality. Conversion is needed when media is being shared among participants using media editing applications based on different media models. For example, when a video editor using a non-linear video editing application wishes to share a draft sequence with a sound editor using a digital audio workstation (DAW), the video editor needs to convert the sequence into a standard format, such as QuickTime, a process which eliminates metadata specific to the editing application's data model. The eliminated metadata may no longer be available for subsequent steps in the production process. Subsequently, when the sound editor adds a sound track to the received QuickTime sequence and exports it back to the video editor or to a producer for review and approval, the export step involves converting the digital audio workstation's rich audio model into a standard format in which metadata of the rich audio model is eliminated.

In addition, editors often use sharing services that were not designed for the very large files that are used in professional media, with consequent transfer delays and unforeseen exhaustion of resources, such as the filling up of a local disc drive. Furthermore, communication among the team members during the various production phases is not well supported, which can lead to duplicative, wasted work, such as audio edits based on an already obsolete version of the video sequence.

There is a need for tools that support collaborative media production to address these problems.

SUMMARY

In general, the methods, systems, and computer program products facilitate collaboration among members of a media production team. A shared project workspace is accessed by each of the team members. The workspace includes a snapshot of the current state of the media project represented in a canonical data model that is readable by each of the media creation/editing applications being used by the team members. The shared project workspace also includes the source assets, including the media essence files, a set of native application data files, one for each of the media applications being used, and change notes that describe recent edits. The change notes include manually entered annotations of the changes as well as automatically generated, machine-readable change primitives. A workflow manager issues change notifications, handles the shared workspace user interface, and supports versioning and editing permissions. When an edit is performed, the application involved flattens the element of the media project for which it is responsible into the canonical form and checks that into the shared space together with its native application data, any new source assets required, and change notes. Thus the shared project workspace includes rich media versions of the media project that include the full metadata for each of the media editing applications, enabling lossless resumption of editing by each of the contributing applications.

In general, in one aspect, a method of enabling collaborative editing of a media project, comprises: providing storage for a shared media project workspace; enabling a first application for editing a first element of the media project to output to the storage: a canonical representation of a current state of the first element of the media project; metadata native to the first application corresponding to the current state of the first element of the media project represented in a media data model of the first application; and data describing an edit to the first element of the media project performed by a user of the first application.

Various embodiments include one or more of the following features. The user of a second application for editing a second element of the media project is able to: retrieve from the storage and play back the canonical representation of the current state of the first element of the media project; and perform an edit on the second element of the media project. The user of the second application for editing the second element of the media project is able to: retrieve from the storage the data describing the edit to the first element of the media project, and the edit performed by the user of the second application on the second element of the media project is based at least in part on the data describing the edit to the first element of the media project. The data describing the edit to the first element is expressed in terms of one or more machine-readable change primitives. The machine-readable change primitives include one or more of the set consisting of a slip, a slide, a trim, a source swap-out, effect, and a time stretch. A module of the second application reads the one or more change primitives and provides information to the second application indicating a portion of the media project associated with the edit to the first element. Enabling the user of the first application to lock at least a portion of the first element of the media project, wherein a locked portion of the media project may be edited only by the user of the first application. The portion is defined as a layer of the media project or a span of the media project. If the first application outputs data to the storage, the data describing an edit performed by the user, issuing a notification of the edit to a plurality of media editing applications in data communication with the storage.

In general, in another aspect, a method for collaboratively editing a media project, the method comprises: on a server in data communication with a plurality of media editing applications, providing storage for a shared media project workspace, wherein the shared media project workspace includes: a canonical representation of a current state of the media project; for each of the plurality of media editing applications, a native application data file defining a current state of a element of the media project associated with that media editing application; and data describing one or more edits performed by one or more users of the plurality of media editing applications. The shared media project workspace further includes media files containing source media upon which the media project is based. The shared media project workspace further includes data defining ownership of one or more portions of the media project by one or more users of the plurality of media editing applications. The plurality of media editing applications include a non-linear video editing application, a digital audio workstation, and at least one of the set consisting of a graphics and effects editing application, review and approval tools, and a media asset manager.

In general, in a further aspect, a computer program product comprises: a computer-readable storage medium with computer program instructions encoded thereon, wherein the computer program instructions, when processed by a computer, instruct the computer to perform a method for collaborative editing of a media project, the method comprising: providing storage for a shared media project workspace; enabling a first application for editing a first element of the media project to output to the storage: a canonical representation of a current state of the first element of the media project; metadata native to the first application corresponding to the current state of the first element of the media project represented in a media data model of the first application; and data describing an edit to the first element of the media project performed by a user of the first application.

In general, in yet another aspect, a method comprises: at a system hosting a media editing application with a display, wherein the system is in data communication with a server hosting software for collaborative media project editing, displaying a graphical user interface for collaborative editing of a media project, the graphical user interface comprising: a representation of a current state of the media project; a media player for playing back the media project; links to source assets for the media project; links to native application data for one or more media editing applications used to edit the media project; and change notes entered by one or more editors collaborating to edit the media project.

In various embodiments the server is in data communication with a plurality of different media editing applications, including the first-mentioned media editing application, and at least one of the links to native application data and change notes are provided by one of the plurality of different applications other than the first-mentioned media editing application.

In general, in another aspect, a computer program product comprises: a computer-readable medium with computer program instructions encoded thereon, wherein the computer program instructions, when processed by a computer, instruct the computer to implement an adapter for a media editing application, wherein the adapter enables a user of a media editing application to edit a media project in collaboration with a user of another media editing application, the adapter comprising: an input for receiving native media and metadata from the media editing application; instructions for translating the native media and metadata into a shared media project format; and an output for sending media in shared project media format to server hosting collaborative media project editing software.

Various embodiments include one or more of the following features. The adapter further receives change notes from the media editing application and sends the change notes to the server. The adapter further receives links to source assets involved in the editing of the media project by the user of the media editing application, and sends the links to the source assets to the server.

BRIEF DESCRIPTION OF THE DRAWINGS

FIG. 16 is a diagram of a screen shot of an exemplary user interface for a collaborative media composition and editing system.

DETAILED DESCRIPTION

Figure 1:
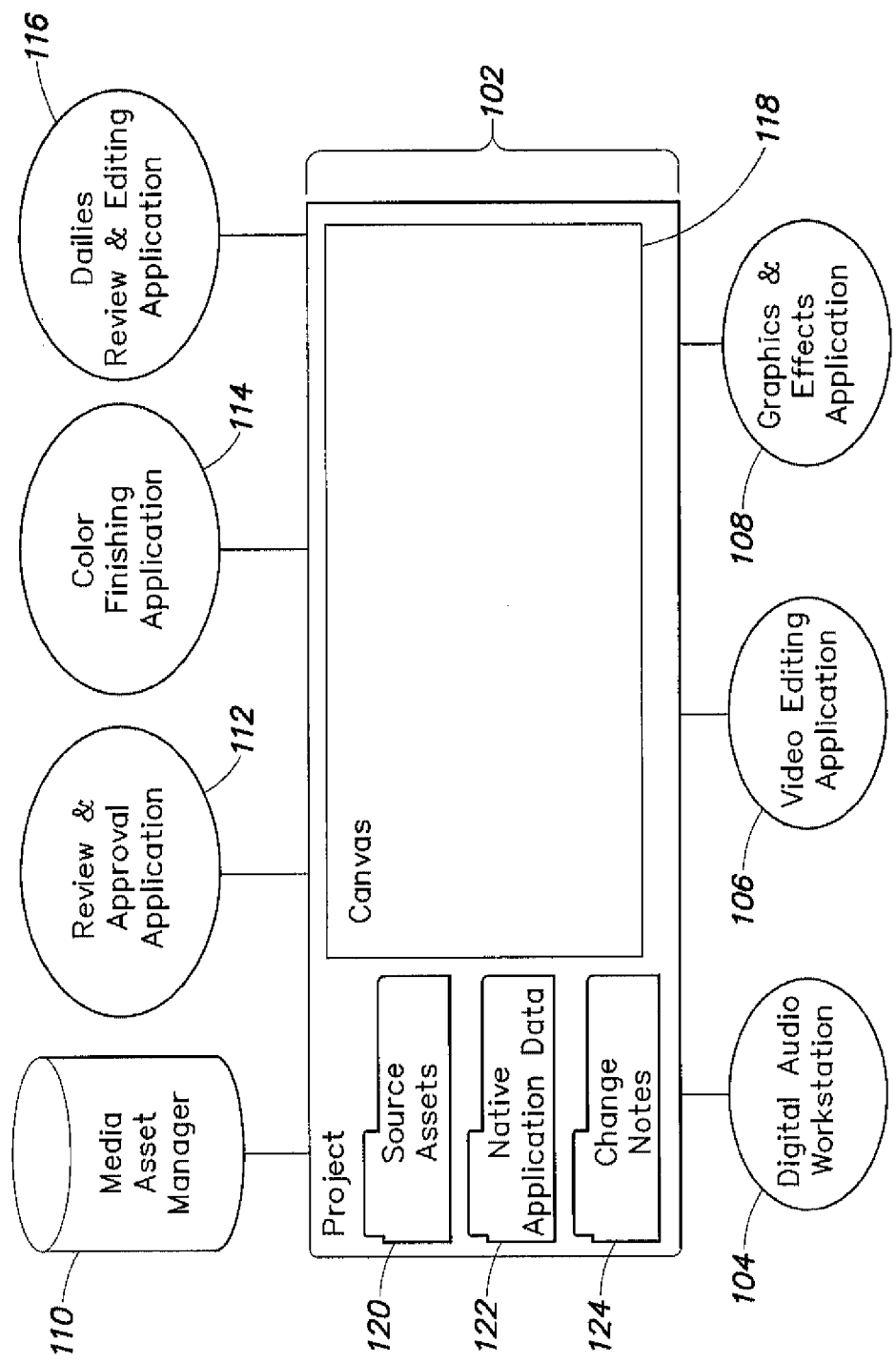
FIG. 1 is a diagram representing a shared project space for a collaborative media composition and editing system.

As media projects become ever more complex, larger teams are being deployed to create a media product collaboratively. Larger teams not only include more than one person working on the same or similar editing and compositional functions, but also a greater diversity of specialists such as audio engineers, special effects artists, finishing editors, and so on. The contribution to the project of each type of media element is often created and/or edited with a different tool. For example, video editing is performed with a non-linear video editing application, audio editing is performed with a digital audio workstation, and special effects with a special purpose effects creation tool. Each of these applications may have its own distinct way of representing the media being worked upon, i.e., each may have their own, specific data model. But for collaboration to be effective, the contributions of each team member need to be shared, and need to be contributed to the end product.

One way of achieving interoperability among team members using applications based on differing media data models is to create a large and complex model that supports the superset of all the individual data models. Each individual media editing application is adapted to support this superset model. A disadvantage of this approach is that a project that is represented in this model includes a large amount of data and metadata that may not be needed for any one application. The result is to increase the size of each project file, which quickly becomes unwieldy as the number of supported applications increases. This approach also requires that the superset model be updated each time there is any change to the model of each of the underlying applications. Not only is this labor-intensive, it also relies on each of the owners of the supported applications providing access to the technical details of their models.

Another approach involves editing a project on each application serially, and using format conversions when passing a work in progress from one application to another. Such conversions may be computationally expensive, and are usually lossy, resulting in media degradation.

We describe an approach that enables collaborative media creation and editing without resorting to a superset data model. Instead, unification among applications and data models is achieved by standardizing project sharing in a format based on a canonical subset of the data models. Collaborative workflows use a shared project space to share the current state of a project expressed in this standard data model, or standard format, while retaining the rich assets associated with each of the data models of the individual applications.

During the process of collaborative creation of a media project, the current state of a project is stored in a project space specifically designated for that project. The project space may be implemented by storage hosted in the cloud, or on a server on a local area network that connects the clients that host the media composition/editing applications. Each of the media composition and editing applications used by members of the project team communicates with the shared project space. Each project space includes a "canvas" that represents a snapshot, or version of the composition. The canvas snapshot is a rendering of the current state of the composition using a standardized format based on a fixed subset of the data models of the individual media composition/editing applications. This format, referred to herein as the Canvas format, is designed to be rich enough to adequately represent the current state of the media composition during the composition/editing phase, without supporting many of the special features of each of the individual applications. In order to enable all applications to read media in Canvas format, each of the applications exposes metadata tags and descriptions using a common format.

In various embodiments, Canvas format uses the Material Exchange Format (MXF) container format for audio and video, supporting a variety of video essence formats including DNxHD, or H.264 for proxies. Canvas format also supports representation of the alpha channel. A rendering of a project in Canvas format provides a framework to which new material and changes can readily be added by any of the project collaborators, with the result playable using each of the applications.

In order to enable each project collaborator to view the current state of a project, each of the media creation/editing applications includes a Canvas format player that can play back Canvas format media. The player is able to read all the standardized metadata tags and descriptions.

In addition to the Canvas format snapshot of the current state of the project, the shared project space also includes source assets that are expected to be used in the project. Such assets may include original essence files, such as video and audio files. Also included in the project space are native application data files, which include metadata in formats native to the application that created the file. In various embodiments, the native application data is stored as a binary Advanced Authoring Format (AAF) file. The native application data file includes pointers to the source files (i.e., the essence), which, as mentioned above, are also stored in the shared project workspace. In other embodiments, the source files are stored locally on the systems that host each of the applications, and shared in a peer-to-peer fashion as needed, amongst the various applications.

Each of the various media editing and composition applications typically use specific terminology to refer to a media work in progress, with its various settings, compositional metadata, and references to source files. Furthermore, the structure of the data varies from application to application. For example, the non-linear video editor MEDIA COMPOSER®, from Avid® Technology, Inc., refers to a media work in progress as a "sequence;" and the data associated with each project includes settings bin files, and clips with the sequence metadata including references to the sources. The DAW application named PRO TOOLS®, also from Avid Technology, refers to an audio work in progress as a "session." Various other applications refer to a media work in progress as a "project" or a "composition." As used herein, the term "project" or "media project" refers to what is being created and/or edited collaboratively by a team of contributors using a range of different media composition and editing tools. Thus at any stage during the collaborative process, a given project is represented in the shared project space both in a Canvas format data model, and as a collection of native application data files, one for each of the contributing applications. Each of the application data files represents the media project as last edited using the corresponding application in a form that enables that application to pick up losslessly from the last edit.

The shared project space also provides a method for enabling project team members to inform each other about changes they have made to the project. When a change is made by a given application, change notes are generated manually and/or automatically, and posted to a folder in the shared project space containing change notes. A central workflow management system sends out change notifications to the team members. The various functions performed by the central workflow manager are described in more detail below.

FIG. 1 is an illustration of a system flow for shared project space 102 for a project in data communication with the following applications: DAW 104, video editing application 106, graphics and effects application 108, media asset manager 110, review and approval application 112, color finishing application 114, and dailies review and editing application 116. Additional media applications may be incorporated into the collaborative workflow. Example applications include: video applications for 3D animation, motion stabilization, and other video "clean-up;" audio applications for editing video sound tracks such as music, dialog, and sound effects; and metadata-related applications such as for closed captioning and logging. The space includes canvas area 118 for presenting a timeline representation of the Canvas format rendering, as well as folders containing source assets 120, native application data 122, and change notes 124. Source assets folder 120 may contain multiple folders with assets corresponding to each of the applications that are being used, or expected to be used, to create and edit the project. Each of the client systems hosting an application is in data communication with the shared project space. The various applications involved in creating and editing a project may each be hosted on a separate platform, or may share platforms with one or more of the other applications.

Figure 2:
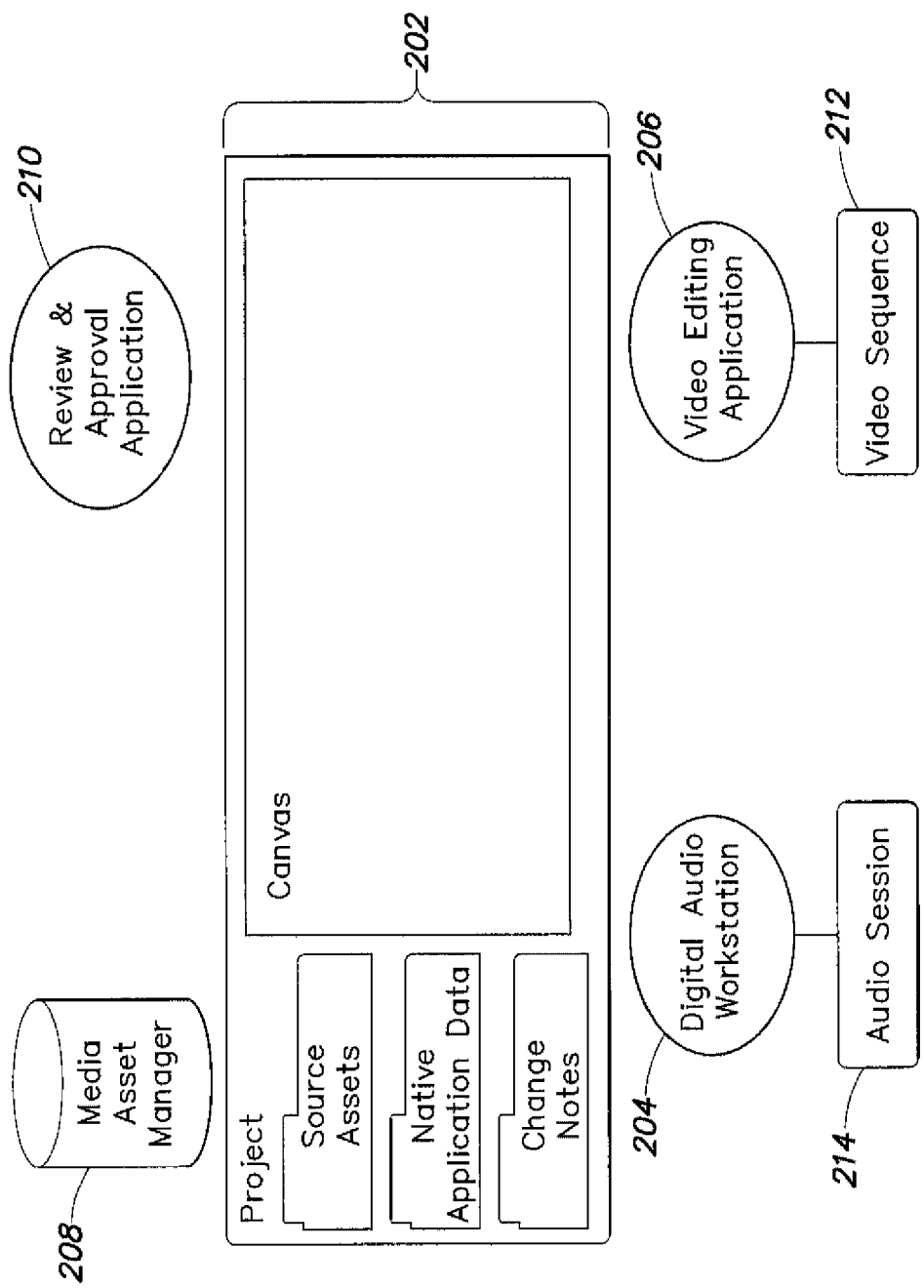
FIG. 2 illustrates the shared project space of FIG. 1 and the creation of an initial audio session and video sequence.
Figure 3:
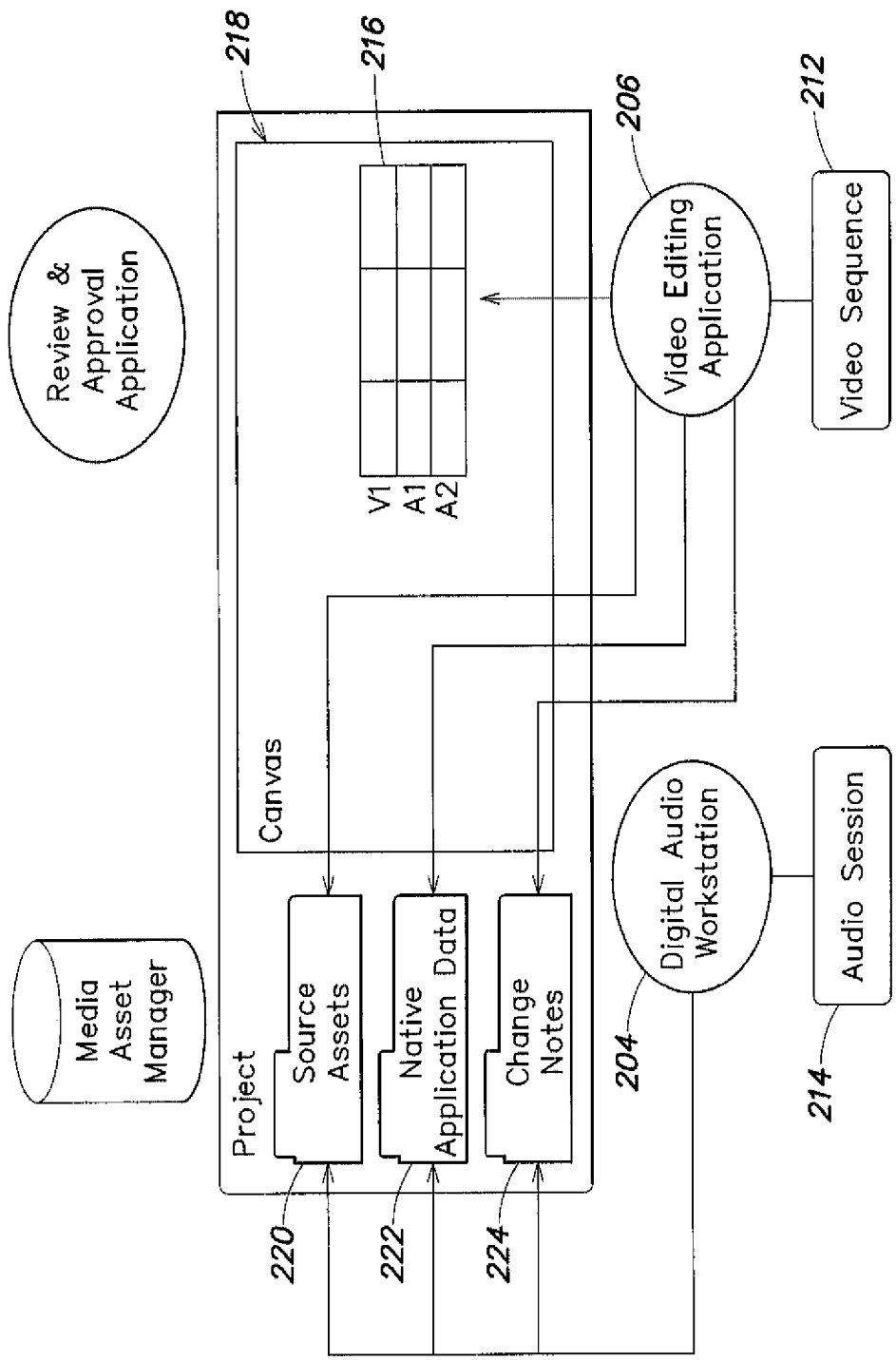
FIG. 3 illustrates the shared project space of FIG. 1 and the flattening to the canonical data model and checking in of the initial video sequence.
Figure 4:
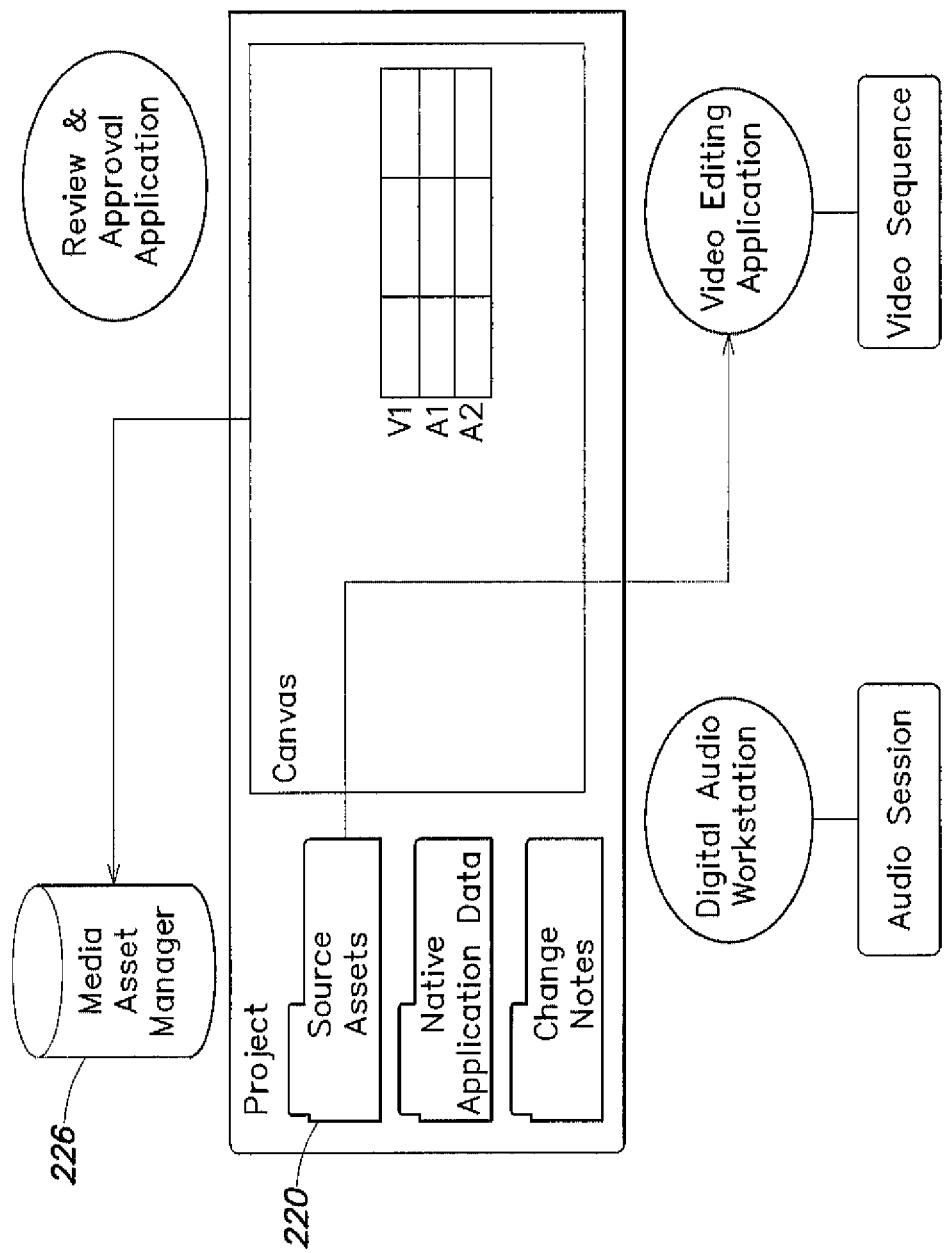
FIG. 4 illustrates the shared project space of FIG. 1 and the retrieval of sources assets by the video editing system.
Figure 5:
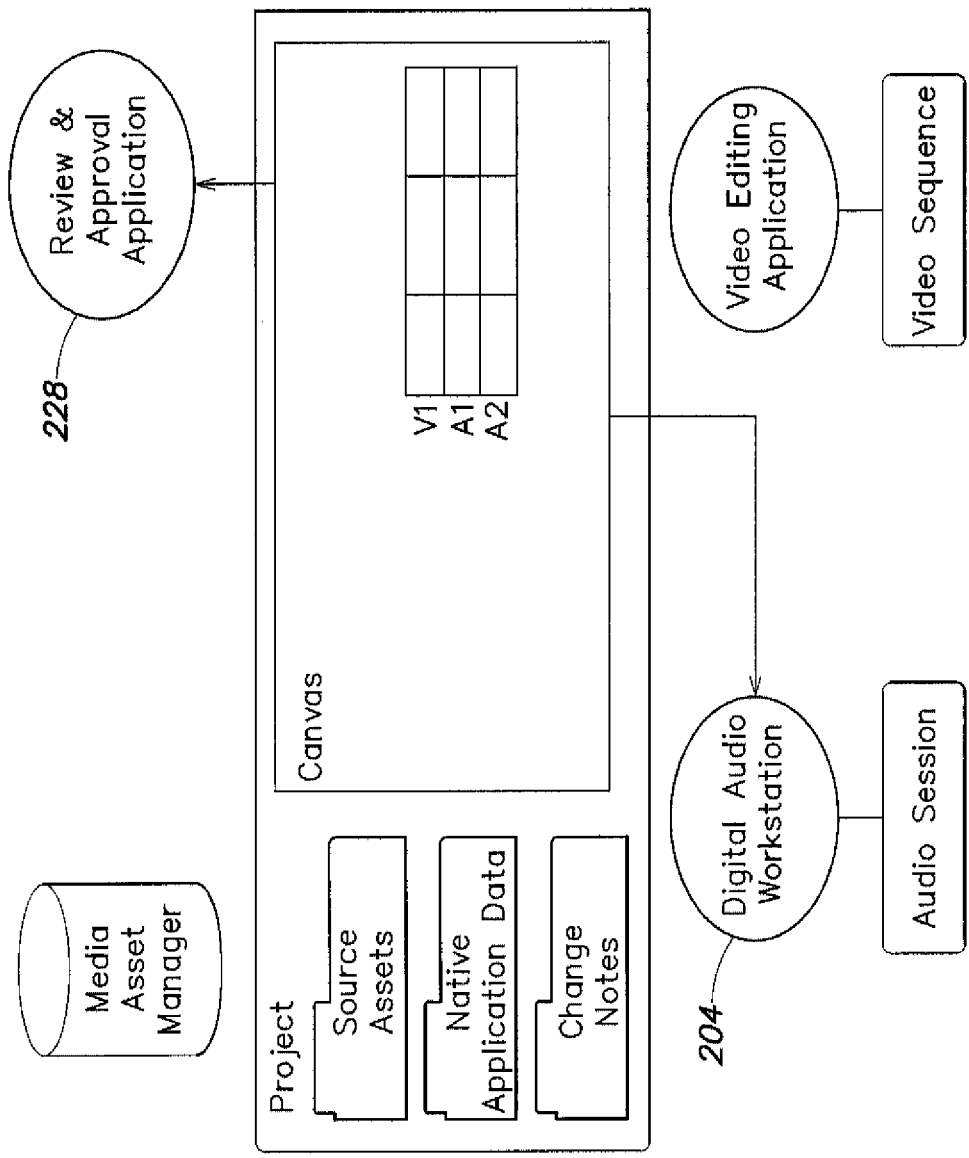
FIG. 5 illustrates the shared project space of FIG. 1 and the import of the shared snapshot of the project by the digital audio workstation.
Figure 6:
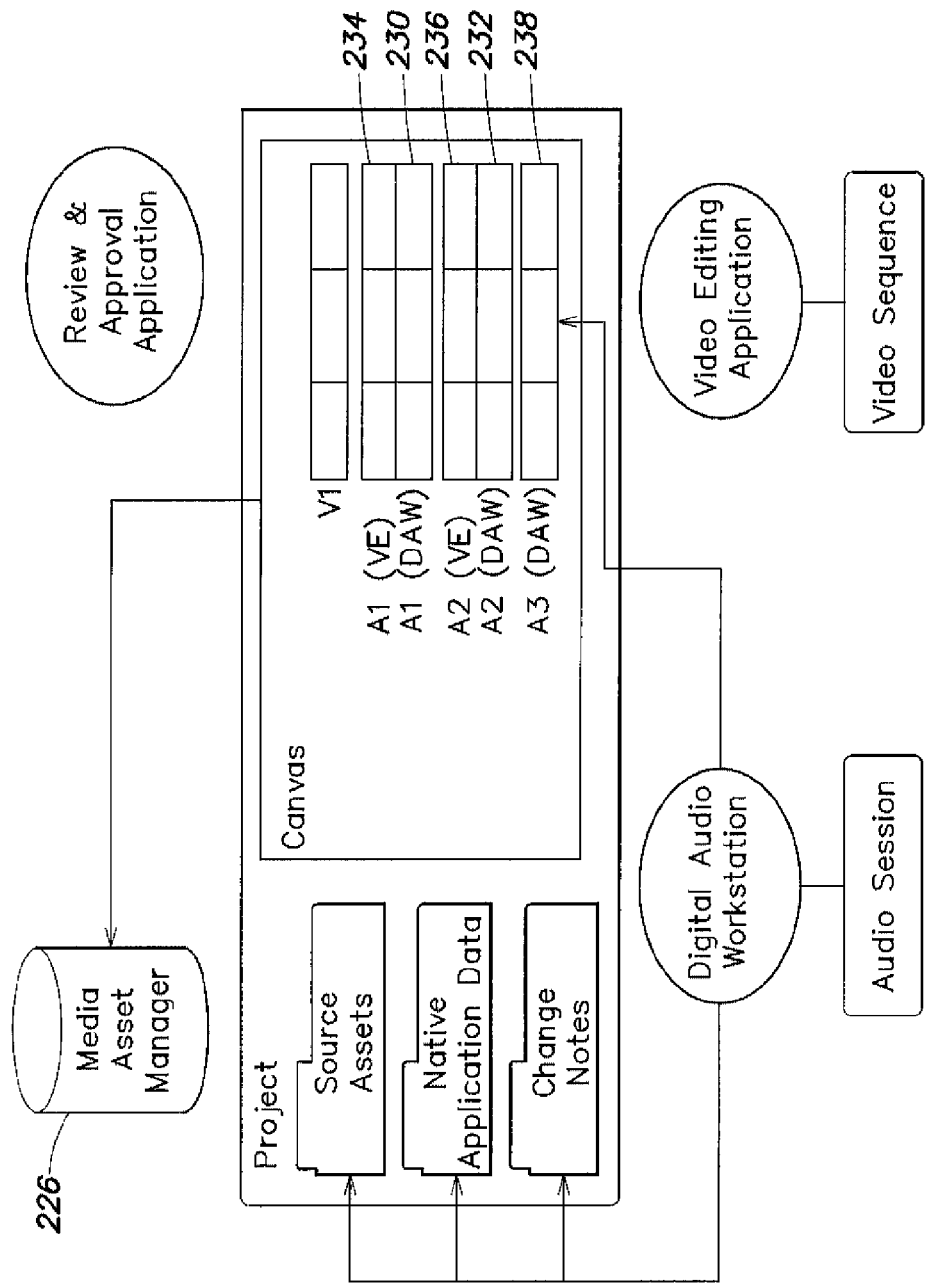
FIG. 6 illustrates the shared project space of FIG. 1 and the flattening to the canonical data model and checking in of the initial audio session.
Figure 7:
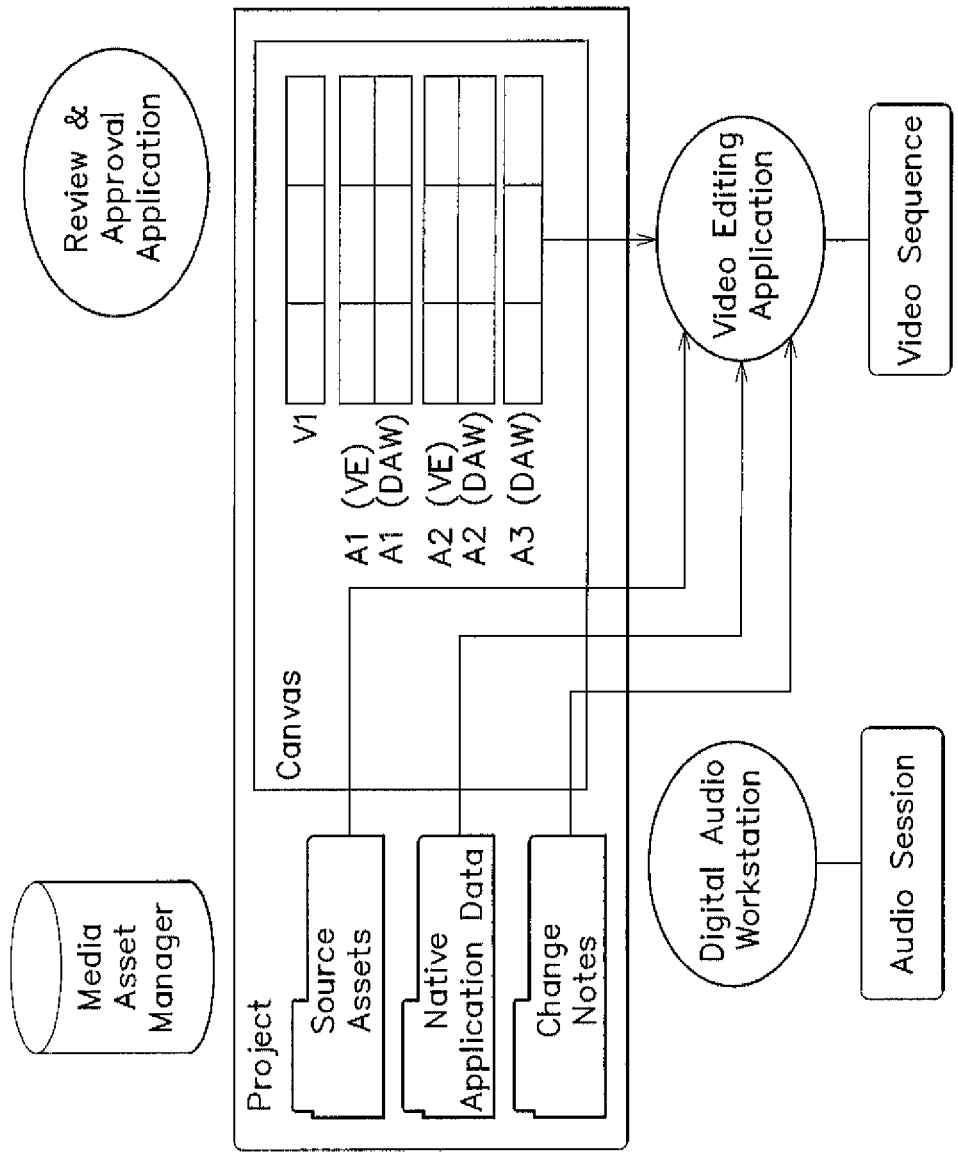
FIG. 7 illustrates the shared project space of FIG. 1 and the retrieval of the current state of the media project in the rich media form using the video editing system's data model as well as the canonical snapshot that includes audio tracks generated using the digital audio workstation.
Figure 8:
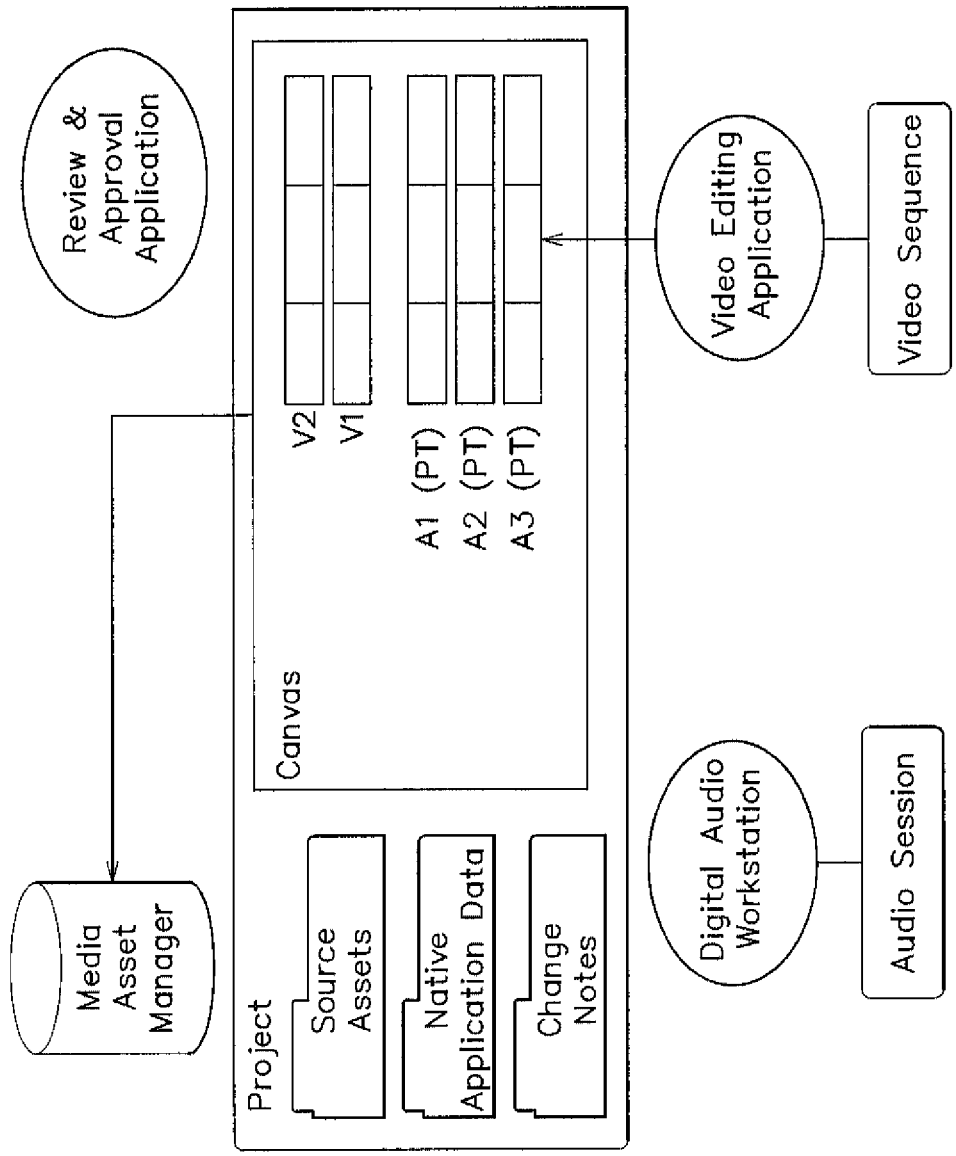
FIG. 8 illustrates the shared project space of FIG. 1 and the checking in of the video sequence together with the removal of audio tracks generated by the video editor.
Figure 9:
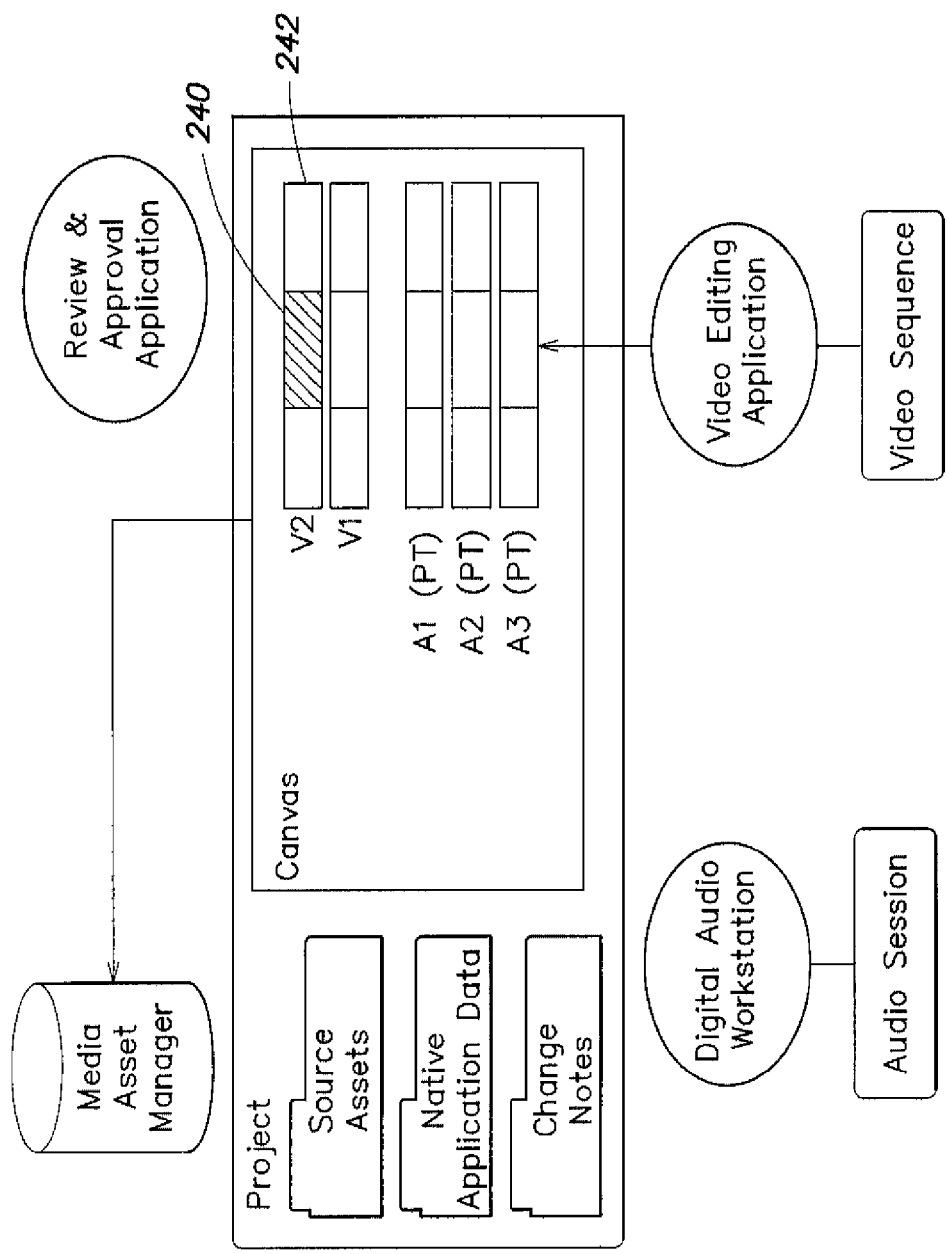
FIG. 9 illustrates the shared project space of FIG. 1 with highlighting of a clip span designated to receive a special effect.
Figure 10:
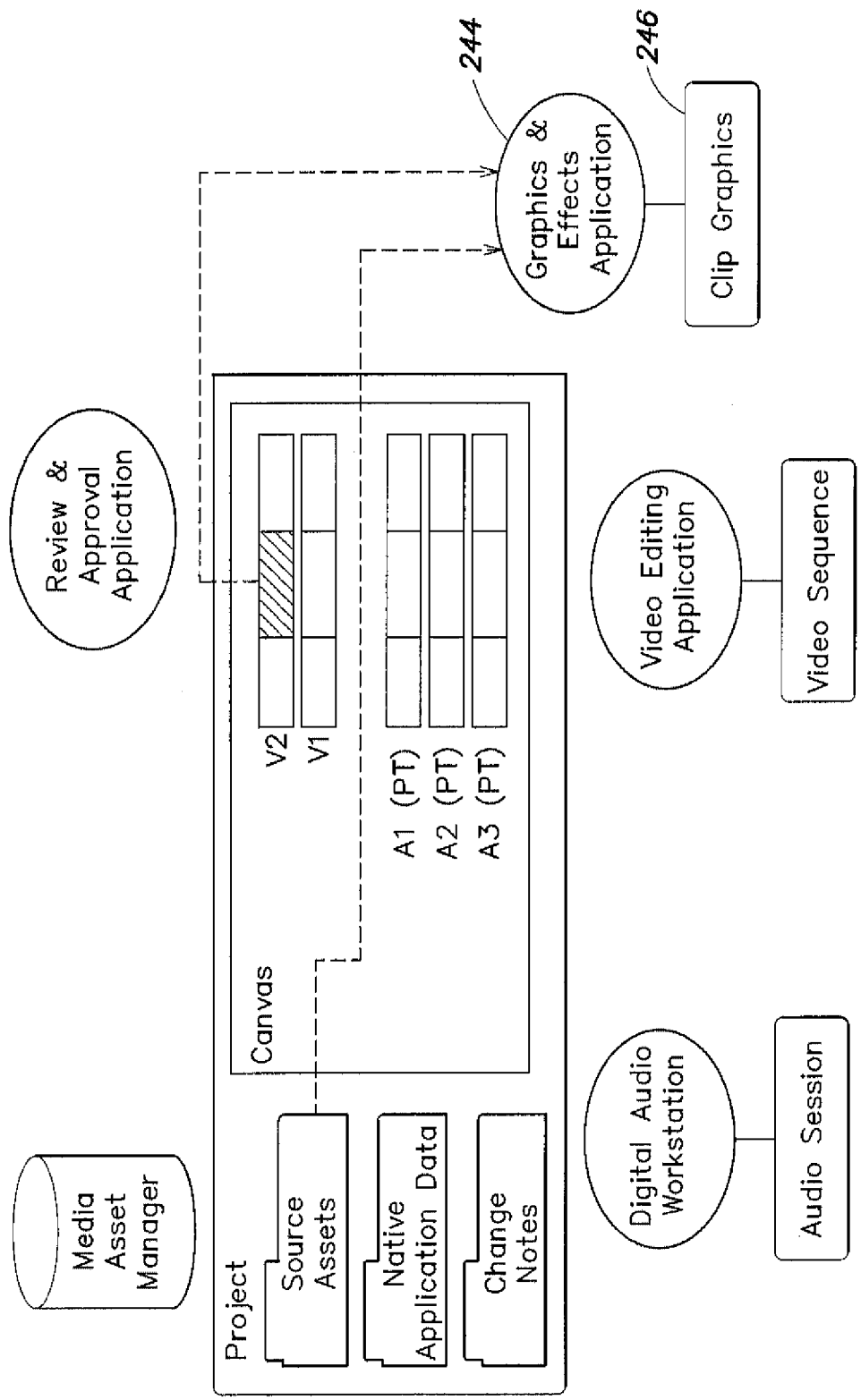
FIG. 10 illustrates the shared project space of FIG. 1 with import of required data to the graphics and effects application.
Figure 11:
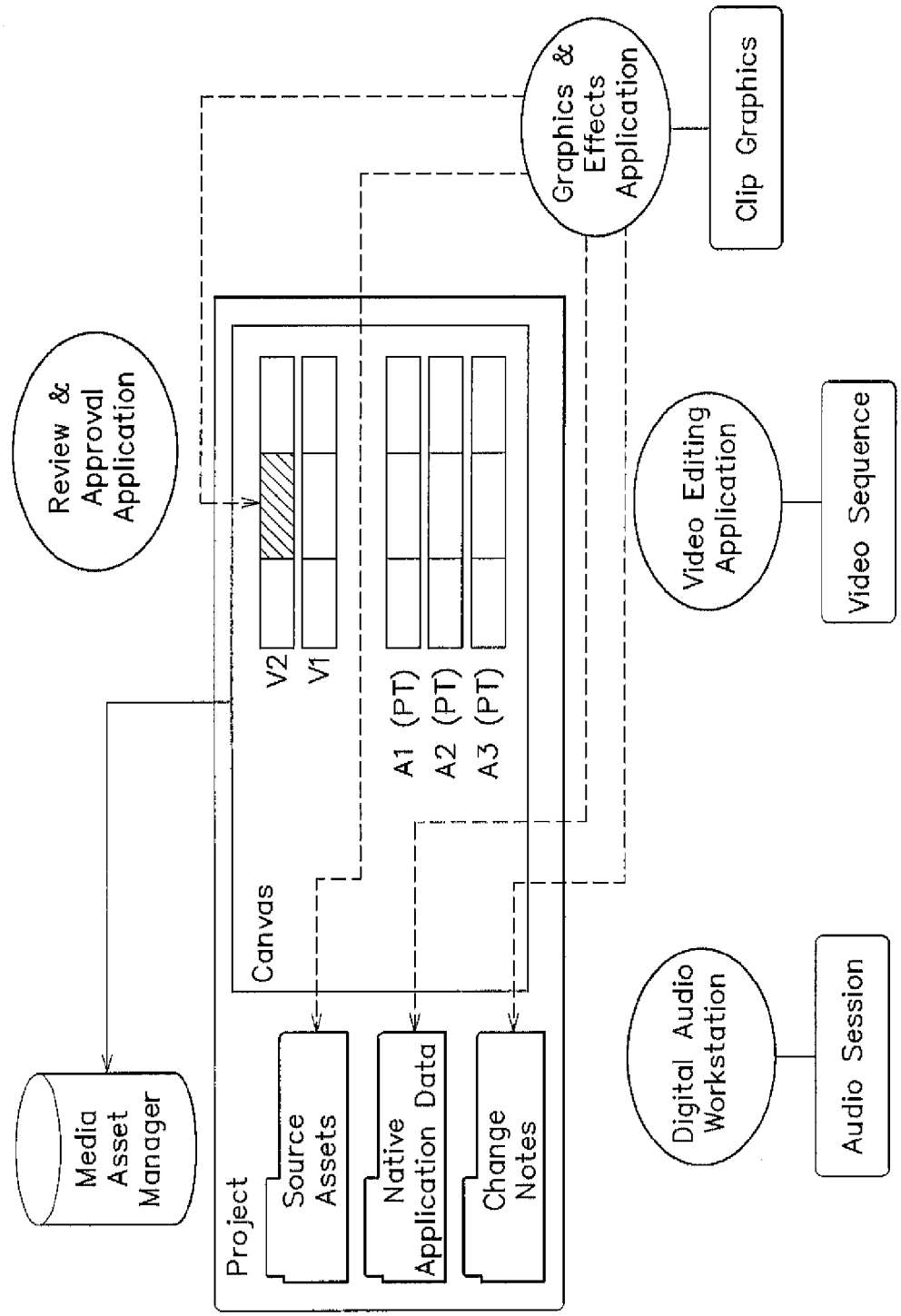
FIG. 11 illustrates the shared project space of FIG. 1 and checking in of graphics and effects by the graphics and effects application.
Figure 12:
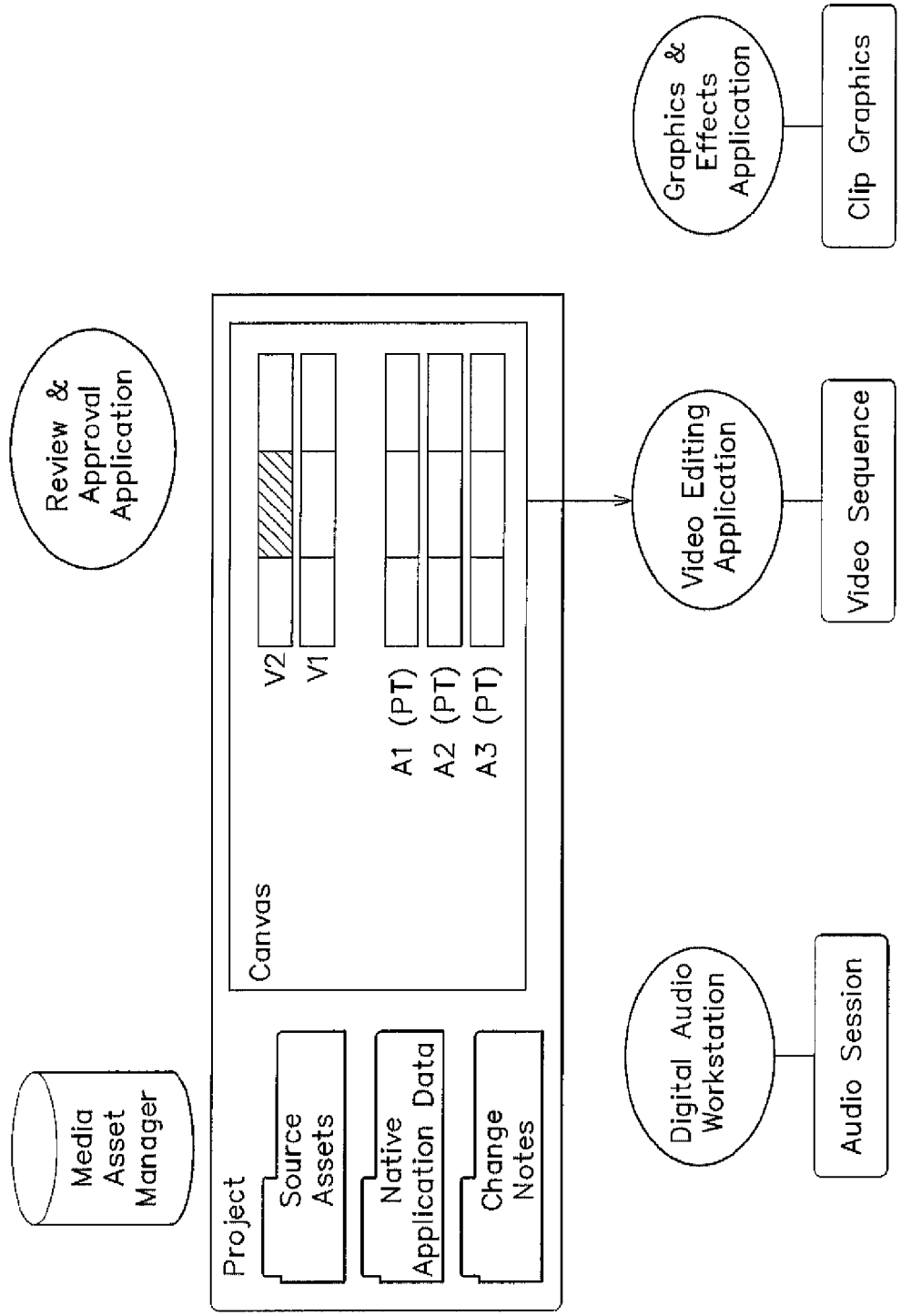
FIG. 12 illustrates the shared project space of FIG. 1 and import by the video editor of the special effect applied to the highlighted clip.

An example of a collaborative media composition/editing workflow using the described shared project space is shown in FIG. 2 and involves shared project space 202, DAW 204, video editing application 206, media asset manager 208, and review and approval application 210. The collaborative creation and editing process begins with new local video sequence 212 created by a user of video editing system 206 and local audio session 214 created at DAW 204. In the next step, illustrated in FIG. 3, the video editor shares a first "rough cut" version of the sequence, and a Canvas format version 216 is rendered and placed on canvas space 218. In addition, video editing application 206 uploads any source files that the project relies upon to source assets folder 220. It also checks in its native application data into native application folder 222. Since this is the first version of the project to be uploaded, there may not be any notes describing project changes per se at this stage, though any notes the video editor wishes to communicate to other members of the project team may be checked in to change notes folder 224. Similarly, the DAW editor adds the audio assets to the source assets folder 220, native application data, as well as any notes to share with other team members, as indicated in FIG. 3. The Canvas format rendering may be checked in to media asset manager 226 so that it can be viewed by anyone with access to the system (FIG. 4). In order to continue editing the project with the benefit of an audio track, the video editor may download audio assets such as music clips from source assets folder 220, as indicated in FIG. 4. The user of DAW 204 may also view the canvas rendering using a Canvas format player plug-in, and determine which tracks, if any, to import (FIG. 5). In addition to audio tracks, video tracks may be imported to the DAW if the video is in a format that can be manipulated by the DAW, such as AAF. The canvas rendering may be retrieved at this stage for review and approval by a producer using review and approval application 228, as shown in FIG. 5. After working on one or more audio tracks, the DAW user may contribute a new version of the edited audio tracks, which are rendered in Canvas format and labeled as A1(DAW) 230 and A2(DAW) 232 in FIG. 6. The prior version of the audio tracks, which were contributed by the video editor are retained, and shown in the figure as A1(VE) 234 and A2(VE) 236. The DAW user may also create one or more new tracks, e.g., A3(DAW) 238, which is also contributed to the canvas. As in previous steps, the updated canvas is saved to the shared project workspace, from which it may be forwarded to media asset manager 226. In addition, the DAW user checks in updated native application data, any new source assets required, and change notes (FIG. 6). When the video editor resumes work on the project, she becomes aware that two of the audio tracks, A1 and A2, are present in two versions, designated A1(VE), A1(DAW) and A2(VE), A2(DAW), and has the option to retrieve audio tracks A1(DAW) and A2(DAW) previously checked in by the audio editor (FIG. 7). If the video editing system does not retain the native application data from prior editing, or if a new system is used to host the video editing application, the video editor retrieves the native application data, sources assets, as well as change notes. Using a Canvas format player plug-in to the video editing system, the video editor retrieves the Canvas format rendering and plays back the audio tracks together with the video. If the video editor is satisfied with the audio editor's changes, she may decide to remove her audio tracks, A1(VE), A2(VE) from the canvas (FIG. 8). However, should the removed tracks be needed later, they may be retrieved from the media asset manager, which saves the history of the Canvas format renderings. The video editor next adds a place holder for an effect on the timeline that needs to be handled by a graphics and effects application, such as AFTER EFFECTS® from Adobe® Systems, Inc., of San Jose, Calif. Timeline region 240 that is to receive the effect is exposed in context on the canvas, as illustrated in FIG. 9 by the shaded portion of video track V2 242 in the timeline. An effects editor using effects and graphics application 244 accesses the Canvas format project and inputs clip graphics media 246 upon which the effect is to be created, drawing upon source assets as well as the Canvas format rendering (FIG. 10). After creating an effect with the input media, the effects editor updates the canvas sequence with the effect and adds the output of the effect in the Canvas format as well as checking in any new source assets required for the effect, native application data in the format native to the graphics and effects application, and change notes (FIG. 11). The new version is recorded in the media asset manager. The video editor may now import data from the effect and graphics application (FIG. 12). If a single editor is performing both the video editing and the graphics and effects editing, the editor may be able to call the effects application from within the video editing system. In this situation, the new application data, source assets, and change notes are still checked in to the canvas so as to expose the graphics/effects data for other team members who need to be able to view the current state of the project.

As mentioned above, color finishing may be included in the collaborative media creation and editing workflow, in which case color finishing application 114 is also connected to shared project space 102 (FIG. 1). In a manner analogous to that described above for the other applications, a color finisher accesses the Canvas format rendering, source assets, and change notes, and performs the color finishing using the Canvas format to view the results. After the edits have been performed, the color finisher checks in a Canvas format rendering of the result, as well as its source assets if it has any, its native color finishing application data, and any change notes that are needed. An example of a color finishing source asset is a look-up-table that is applied to change the aesthetic properties of the video. Similarly, when dailies are being produced during shooting of a feature film, episodic TV program, or another type of project, an assistant editor uses a connected dailies review and preparation application to introduce original camera footage into the production environment in a form suitable for editing. The assistant editor then renders the result out to Canvas format and checks it into the shared project space on the collaboration server, together with source assets, native application data, and change notes.

Figure 13:
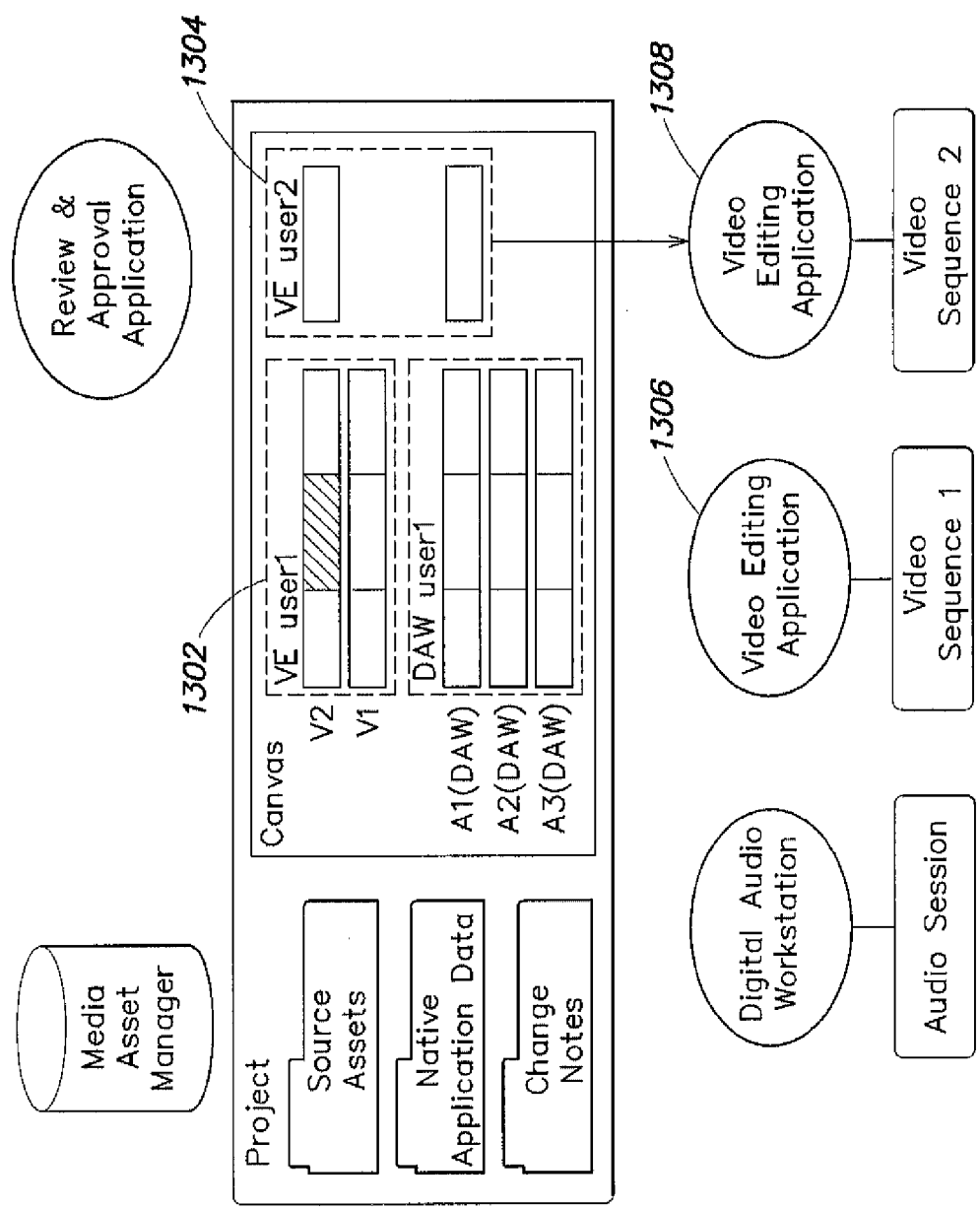
FIG. 13 illustrates the shared project space of FIG. 1 with the addition of a second video editing system, and display of shared project allocation to different users.

In a collaborative environment in which there is a division of labor, it is necessary to prevent more than one person from working on a given part of the project at the same time. This is implemented by a permissions scheme, in which each user, or group of users, owns a part of project as represented in the canvas data model. Ownership may be assigned by layers by media type, with the video layers being owned by one or more video editors, and audio layers by one or more audio editors. Ownership may also be assigned by spans, such as when a graphics/effects artist assigned to work on a span within a track, as illustrated in FIGS. 10 and 11. The shared project workflow manager displays the current ownership status of the elements of the model on the canvas, informing users of the elements to which they have permission to change, and areas that are locked for them. The permissions may be assigned in a centralized fashion by a single project manager, or may be assigned upon request by each of the participating team members. Once assigned, each collaborator maintains her assigned portion of the project. FIG. 13 illustrates a method of representing the ownership of the various elements of the project, including an example of assigning two different spans 1302 and 1304 to two different video editors. In a typical permission scheme, the parts of the sequence owned by each user do not overlap. This makes it straightforward to merge changes from other team members.

The rendering of the various elements of the project in Canvas format is performed by Canvas adapter software that is aware of the Canvas format project snapshot. Such awareness includes managing information that specifies the portion of the project that is currently owned by a particular application, as defined by temporal spans of one or more tracks and/or metadata of the project. In the example shown in FIG. 13, Canvas adapter software running on video editing application 1306 limits the user to portion 1302 of the project, and when that user's work is ready to be checked back in, it renders the newly edited video and inserts it into the Canvas format project. Canvas adapter software includes a renderer that renders the native format media of a particular media application and renders it out in Canvas format.

Figure 14:
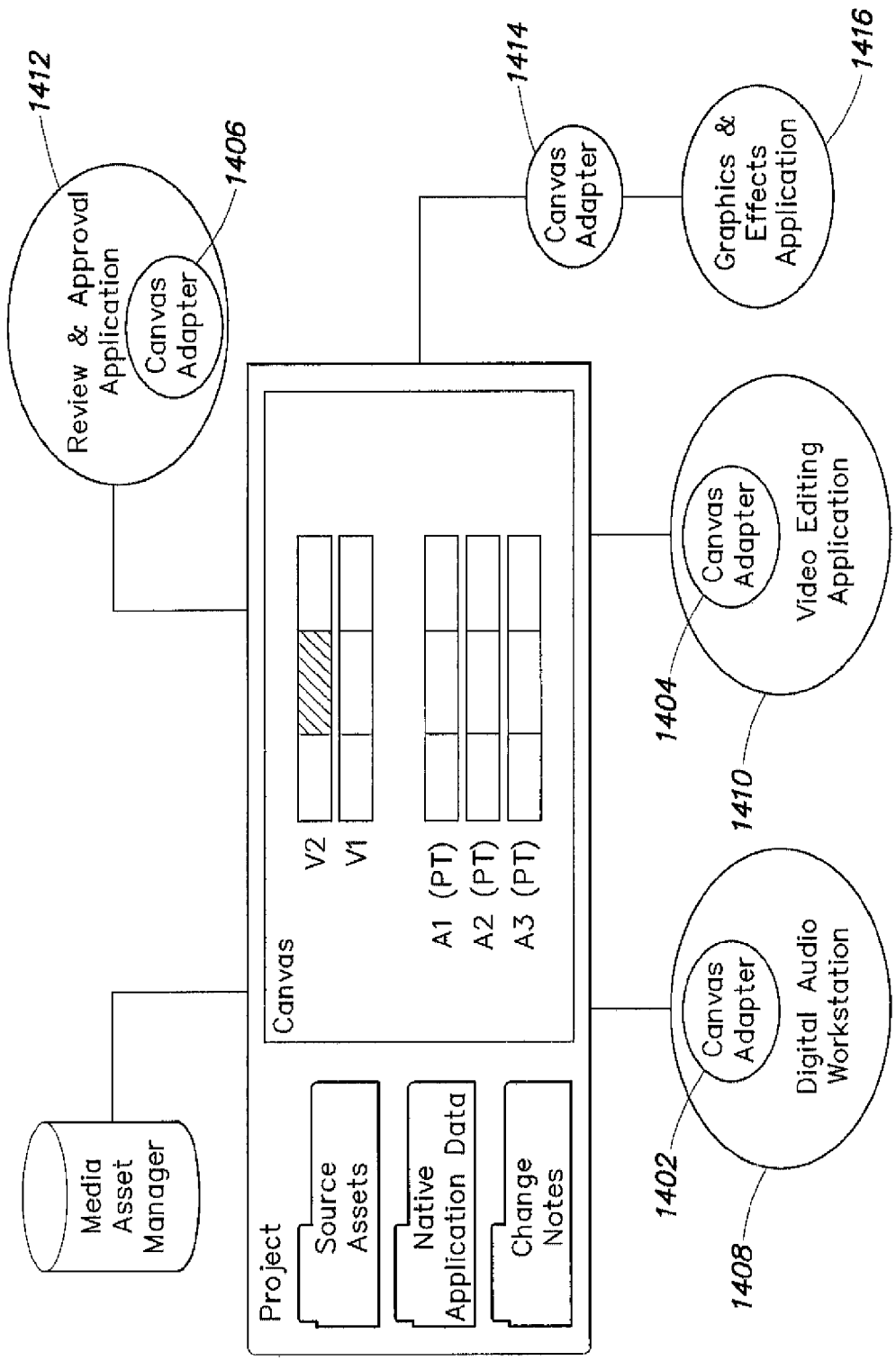
FIG. 14 illustrates the use of internal and external adapters for adapting media applications for operation with a shared project space for collaborative media editing.

For "Canvas aware" applications, the Canvas adapter software is included within the application software, as illustrated with Canvas adapters 1402, 1404, and 1406 incorporated into DAW 1408, video editing application 1410, and review and approval application 1412 respectively in FIG. 14. In a Canvas aware application, a user is able to issue a single "update Canvas" command, and the adapter performs the rendering, manages the metadata transfer, and exports the Canvas format version to the shared project space in the collaboration server. For applications that are not Canvas aware, a separate Canvas adapter software module is required to perform the rendering and metadata management, as indicated with Canvas adapter 1414 for non-Canvas-aware graphics and effects application 1416.

The use of the Canvas format snapshot that is standardized among all media editing applications also greatly streamlines media and production asset management systems. These systems need only include a single Canvas format player in order to allow media browsing across all native formats. Similarly, the ability to view stock footage is also enhanced—all applications are now able to share the same catalogs.

In order to facilitate collaborative workflows through the various phases of producing a media project, the shared project workflow manager supports a change notification scheme. As indicated above, each time a team member makes a change, a set of change notes are checked into the shared project workspace. The change notes are in two forms: manually entered text that is entered by the user of the application making the change; and automatically generated, machine-readable change primitives. When a team member starts editing the project, the change notes are retrieved, along with the native application data, if available, and any required source assets. The manually entered text provides the team member with information about the most recent edit or the edits performed since the team member last checked in her element. This enables her to determine whether the change affects her and needs to be addressed, or whether it has no bearing on her contribution to the project. For example, if an audio editor sees that the latest change involved shortening the duration of a video clip for which she maintains the corresponding audio track, she knows that the audio will probably need to be changed as well. However, if the most recent change was a color correction, the change probably does not implicate the audio at all, and she can ignore the change.

The automatically generated change notes are created automatically by comparing the new version with the previous version. A difference tool expresses the changes in terms of a set of standard change primitives that are able to capture a majority of the changes that can be made. Examples of common video edits that are expressed in terms of change primitives include, but are not limited to: slip, slide, trim, source swap-out, effect, and time stretch. Each of the contributing applications includes a software module that is able to express the majority of the edits in terms of such change primitives, and export them in a standardized fashion to the shared project workspace. When a team member using a different application retrieves the change notes, her application uses a change primitive input module to interpret the automatically generated change notes. The application is then able to make use of the change information to guide the team member, both as to whether the change is likely to have an impact on the project portion for which the member is responsible, and also to direct the user's attention to the track, clip, span, or other specific portion of or location within the project that was changed and that requires attention. Using the example referred to above in which a video editor has checked into the shared project space a version that includes a changed duration of a clip, the audio editor receives a change notification and retrieves the change notes, along with the current Canvas format snapshot. The audio editor's DAW, upon interpreting the change note, directs the editor's attention to the temporal location corresponding to the latest clip duration edit. If several edits were made, the audio editing application directs the audio editor's attention to each of the locations that have been changed. This guidance greatly speeds up the task of conforming the different layers of a project to each other.

Figure 15:
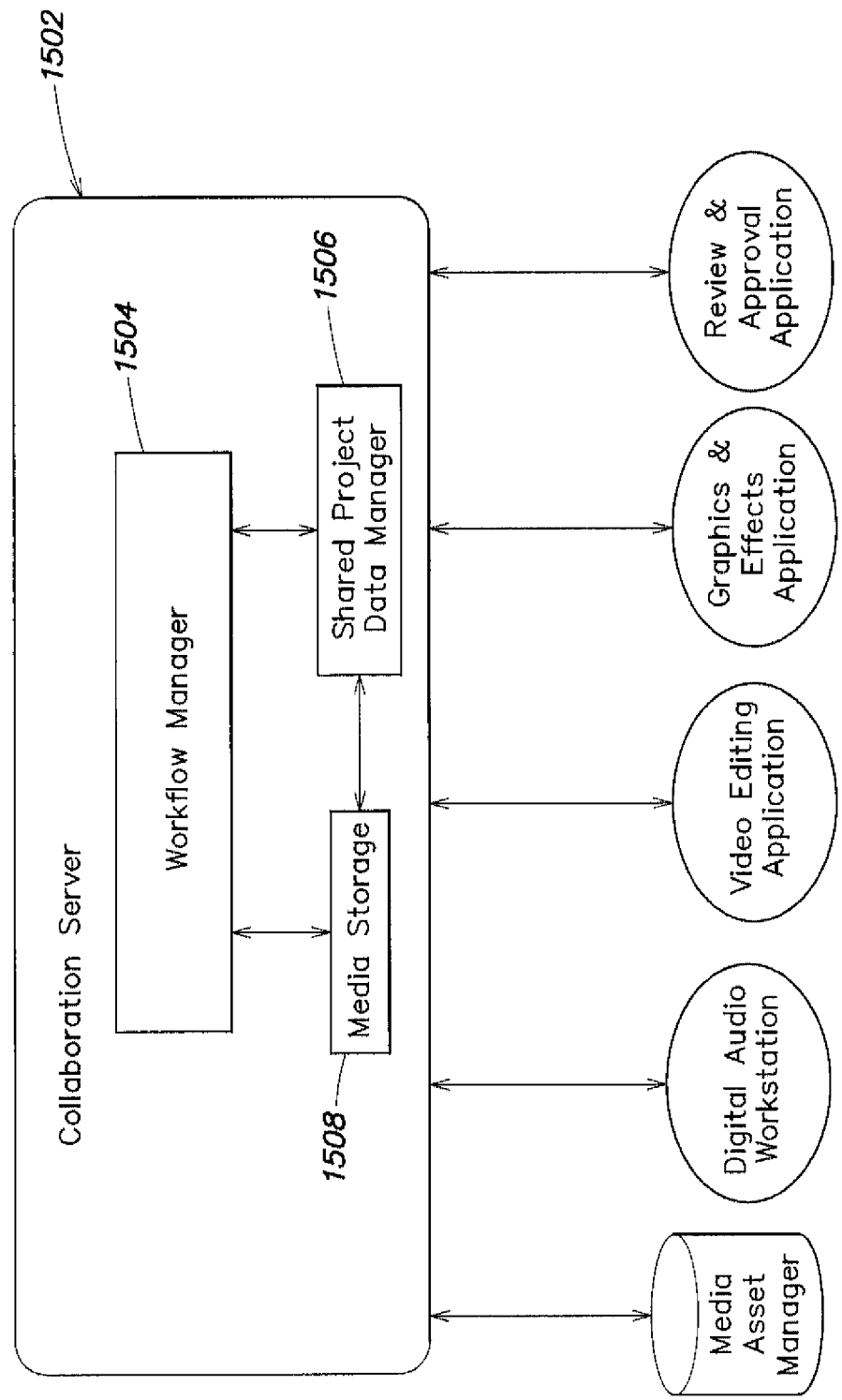
FIG. 15 is a high level diagram of an architecture for implementing a collaborative media composition and editing system.

An architecture for implementing the collaborative media project creation and editing methods described herein is illustrated in FIG. 15. Collaboration server 1502 is implemented using a computer system that is either local to the application, such as on a local area network, or is hosted over a wide area network. The collaboration server may be implemented using one or more servers hosted in the cloud. Workflow manager 1504 coordinates and issues notifications, performs versioning, manages the permissions, and serves as the application server for the shared project space user interface. Shared project data manager 1506 holds the relationships among elements in the canvas, together with the native application data. Media storage 1508 holds the source media files included in the project, or that might be needed in the project. The various applications used by the project team collaborators are in data communication with the collaboration server, either over a local area network, or over a wide are network. In various embodiments, the collaboration server is hosted by the same system that hosts one of the applications.

In the case where two content creators are collaborating to create content using the same application, an effective workflow can be supported using shared bins for video editing, or shared sessions for audio editing. Editors collaborate directly with each other via a bin service, which may be hosted by a collaboration server on a local LAN or hosted remotely in the cloud. The editor is able turn bin sharing on within the application and the bin's metadata is replicated in a cloud account which can also be shared with other users. Once the bin is shared, one editor can push media to the system of another editor, or allow the remote system to pull the media locally over a P2P secure connection. The user can either push the hi-res or the low-res and can push full or partial clips and sequences.

In a manner similar to that discussed above in connection with the shared project workspace, team members may lock portions of the timeline—either by time span, or by track type. In this situation, each editor only needs to have the essence corresponding to the portion being edited. Since the native application data corresponding to the current state of the media project is of small size, it is possible to share this fully among the collaborating editing platforms, while only partially sharing the underlying essence. For example, the timelines seen by two collaborating editors may be kept up-to-date even if the essence corresponding to the current sequence is not present. Indeed, a complete bin of clips, sequences, and effect metadata may be shared. Thus there is a bifurcation in the way the metadata and its corresponding media is shared. Metadata is shared either via a peer-to-peer connection, or via a server hosted in the cloud. The reference copy of the metadata is stored in the server providing the shared bin service, e.g., in a cloud server. This helps ensure that the most recent version is available, even if an editing station is offline. Furthermore, the cloud copy of the metadata could be used in the event the user experiences a catastrophic loss on their local system resulting in the loss of sequence and bin metadata.

The essence corresponding to a work in progress being edited may be selectively pushed or pulled from within a clip or edited series of clips. The editor may select (using in and out points) a portion of a clip or sequence and pull or push the media (either high or low-resolution). The media is shared selectively over a peer to peer connection or via the cloud server.

A diagrammatic screen shot 1602 of exemplary user interface for the Canvas collaborative workspace is shown in FIG. 16. The Canvas format timeline is shown in window 1604, showing two video tracks and three audio tracks, each comprising multiple clips. Monitor window 1606 shows the output of a Canvas format player. Links to native application data are shown at 1608. Change notes are displayed in window 1610, and change history window 1612 lists the users, their applications, the project tracks, and the date stamps corresponding to recent changes that have been checked in to the collaboration server. The UI may also display a window showing links to source assets (not shown in the Figure).

In some situations, selective pulling or pushing of high resolution media is performed. In one scenario, an editor has the full sequence in low resolution, but needs the high resolution for a short span, in order to read the text on a logo or to perform detailed work on a portion. The ability to push media to a collaborator's system is facilitated by providing data on the available capacity of the receiving system. The receiving system may be set to allocate only a portion of its available space for pushed media. The available space dedicated to receiving media pushed by other team members may be subject to a limit imposed by the total physical space on the receiving system, or by an account or user-defined limit.

The various elements of the system hosting an application being used by a media project team member, or of a collaboration server or bin service system, or other computer systems described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software or hardware or firmware, or a combination of the three. The various components of the system, either individually or in combination may be implemented as one or more computer program products in which computer program instructions are stored on a computer readable storage medium for execution by a computer, or transferred to a computer system via a connected local area or wide area network. The storage medium may include one or more of solid state memory, magnetic media such as hard disk drives, and optical media, such as read only or read/write CDs and DVDs. The system may include a communication connection device such as a network interface that transmits data and receives data from a communication medium, such as radio waves, signals carried by wires. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of enabling collaborative editing of a media project, the method comprising:
    providing storage for storing in a shared media project workspace:
        a canonical representation of a current state a first element of the media project, wherein the canonical representation is based on a subset of media project data models of a plurality of different media processing applications, such that each of the plurality of different media processing applications is able to read the canonical representation of the current state of the media project and generate the canonical representation of the current state of the media project;
        metadata native to each of the plurality of different media processing applications; and
        data describing edits performed to the media project using one or more of the plurality of different media processing applications;
    in response to a first user using a first media processing application of the plurality of different media processing applications to edit a first element of the media project:
        generating metadata native to the first media processing application of the plurality of different media processing applications corresponding to a current state of the first element of the media project represented in a data model of the first media processing application;
        generating data describing the edit to the first element of the media project performed by the first user using the first media processing applications;
        generating an updated canonical representation of the current state of the media project; and
        writing the updated canonical representation, the metadata native to the first media processing application, and the data describing the edit to the first element of the media project to the storage; and
    in response to a second user using a second media processing application of the plurality of different media processing applications to edit a second element of the media project:
        generating metadata native to the second media processing application corresponding to a current state of the second element of the media project represented in a data model of the second media processing application;
        generating data describing the edit to the second element of the media project performed by the second user using the second media processing application;
        generating a further updated canonical representation of the current state of the media project; and
        writing the further update canonical representation, the metadata native to the second media processing application, and the data describing the edit to the second element of the media project to the storage.

2. The method of claim 1, further comprising:
    retrieving from the storage and playing back the canonical representation of the current state of the first element of the media project, wherein the retrieving and playing back is performed by one of the first media processing application and the second media processing application of the plurality of different media processing application.

3. The method of claim 2, further comprising:
    using the second media processing application to retrieve from the storage the data describing the edit to the first element of the media project; and
    wherein the edit performed by the user of the second application on the second element of the media project is based at least in part on the data describing the edit to the first element of the media project.

4. The method of claim 2, wherein the data describing the edit to the first element is expressed in terms of one or more machine-readable change primitives.

5. The method of claim 4, wherein the machine-readable change primitives include one or more of the set consisting of a slip, a slide, a trim, a source swap-out, effect, and a time stretch.

6. The method of claim 4, wherein a module of the second media processing application reads the one or more change primitives and provides information to the second application indicating a portion of the media project associated with the edit to the first element.

7. The method of claim 1, further comprising enabling the user of the first media processing application to lock at least a portion of the first element of the media project, wherein a locked portion of the media project may be edited only by the user of the first media processing application.

8. The method of claim 7, wherein the portion is layer of the media project.

9. The method of claim 7, wherein the portion is span of the media project.

10. The method of claim 1, further comprising issuing a notification of the edit to the first element of the media project to the plurality of different media processing applications.

11. A method for collaboratively editing a media project using a plurality of different media processing applications, the method comprising:
    in response to a first user using a first media processing application of the plurality of different media processing applications to edit a first element of the media project, generating and storing in shared storage:

metadata native to the first media processing application of the plurality of different media processing applications corresponding to a current state of the first element of the media project represented in a data model of the first media processing application;
data describing the edit to the first element of the media project performed by the first user using the first media processing application; and
an updated canonical representation of the current state of the media project wherein the updated canonical representation is based on a subset of media project data models of the plurality of different media processing applications; and
in response to a second user using a second media processing application of the plurality of different media processing applications to edit a second element of the media project, generating and storing in the shared storage:
metadata native to the second media processing application corresponding to a current state of the second element of the media project represented in a data model of the second media processing application;
data describing the edit to the second element of the media project performed by the second user using the second media processing application; and
a further updated canonical representation of the current state of the media project, wherein the further updated canonical representation is based on an updated subset of media project data models of the plurality of different media processing applications; and
wherein each of the plurality of different media processing applications is able to read the updated and the further updated canonical representations of the current state of the media project.

12. The method of claim 11, wherein the shared storage further includes media files containing source media upon which the media project is based.

13. The method of claim 11, wherein the shared storage further includes data defining ownership of one or more portions of the media project by the one or more users of the plurality of different media processing applications.

14. The method of claim 11, wherein the plurality of different media processing applications includes a non-linear video editing application, a digital audio workstation, and at least one of a set consisting of a graphics and effects editing application, review and approval tools, and a media asset manager.

15. A computer program product comprising:
a non transitory computer-readable storage medium with computer program instructions encoded thereon, wherein the computer program instructions, when processed by a computer, instruct the computer to perform a method for collaborative editing of a media project, the method comprising:
providing storage for storing in a shared media project workspace:
a canonical representation of a current state of the media project, wherein the canonical representation is based on a subset of media project data models of a plurality of different media processing applications, such that each of the plurality of different media processing applications is able to read the canonical representation of the current state of the media project and generate the canonical representation of the current state of the media project;
metadata native to each of the plurality of different media processing applications; and
data describing edits performed to the media project using one or more of the plurality of different media processing applications;
in response to a first user using a first media processing application of the plurality of different media processing applications to edit a first element of the media project:
generating metadata native to the first media processing application of the plurality of different media processing applications corresponding to a current state of the first element of the media project represented in a data model of the first media processing application;
generating data describing the edit to the first element of the media project performed by the first user using the first media processing application;
generating an updated canonical representation of the current state of the media project; and
writing the updated canonical representation, the metadata native to the first media processing application, and the data describing the edit to the first element of the media project to the storage; and
in response to a second user using a second media processing application of the plurality of different media processing applications to edit a second element of the media project:
generating metadata native to the second media processing application corresponding to a current state of the second element of the media project represented in a data model of the second media processing application;
generating data describing the edit to the second element of the media project performed by the second user using the second media processing application;
generating a further updated canonical representation of the current state of the media project; and
writing the further updated canonical representation, the metadata native to the second media processing application, and the data describing the edit to the second element of the media project to the storage.

* * * * *